United States Patent [19]

Draman

[11] Patent Number: 4,660,602
[45] Date of Patent: Apr. 28, 1987

[54] MOBILE SLUDGE TRANSFER AND STORAGE TANK

[76] Inventor: Dennis J. Draman, Box 845, Clemmons, N.C. 27012

[21] Appl. No.: 714,934

[22] Filed: Mar. 22, 1985

[51] Int. Cl.⁴ ............................................. A01G 25/09
[52] U.S. Cl. .................................. 137/899.4; 137/563; 137/565; 239/127; 239/148; 239/172
[58] Field of Search ............... 239/124, 127, 142, 172, 239/148, 304; 137/563, 565, 899, 899.4

[56] References Cited

U.S. PATENT DOCUMENTS

| | | | |
|---|---|---|---|
| 3,280,841 | 10/1966 | Deutsch | 137/899 |
| 3,386,660 | 6/1968 | Marriam | 239/172 |
| 3,491,949 | 1/1970 | Hairston | 137/563 |
| 3,913,606 | 10/1975 | Anderson, Jr. | 137/563 |
| 3,929,154 | 12/1975 | Goodwin | 137/899 |
| 4,244,522 | 1/1981 | Hartwig | 239/148 |
| 4,430,028 | 2/1984 | Clayton et al. | 137/899 |
| 4,491,150 | 1/1985 | Holman et al. | 137/899 |

Primary Examiner—A. Michael Chambers

[57] ABSTRACT

A mobile sludge transfer and storage tank and method are provided whereby the sludge transfer and storage tank is provided with an enclosed compartment for containing pumping apparatus. Also included is a telescoping control panel attached to the tank housing for controlling the pumping apparatus to improve the speed, efficiency and convenience of operation. The method includes pumping the sludge into the transfer and storage tank from the transport vehicle or directly to the applicator vehicle if required to provide a rapid system of sludge distribution.

8 Claims, 3 Drawing Figures

MOBILE SLUDGE TRANSFER AND STORAGE TANK

BACKGROUND OF THE INVENTION

1. Field of the Invention

The present invention relates to an improved transfer and storage tank and method for use in receiving and dispensing treated sludge in a convenient and rapid manner.

2. Description of the Prior Art and Objectives of the Invention

Mobile sludge transfer storage tanks have long been used which are connected to conventional truck tractors and towed to a work site for use. Once positioned, the tractor disconnects from the storage tank and returns as required to move the tank to another location. Prior art mobile storage tanks generally include a pair of rear wheels whereupon disconnecting from the tractor, it will remain at the job site in a relatively stable position. Such prior art tanks do not have pumping apparatus included therewith and accessory pumps must be used to fill the storage tank from transport vehicles which haul the sludge to the storage tank. Applicator vehicles used to apply the sludge to the fields conventionally generate suction from their own apparatus for filling their tanks. The suction generated by the applicator vehicles is oftentimes insufficient at the time they arrive at the mobile storage tank for filling and they must wait until sufficient suction or vacuum pressure builds until they can refill, oftentimes causing delays and frustrations to the drivers and operators. Such prior art tanks also require the connecting and disconnecting of suction hoses for each load transferred to the applicator vehicle.

With this background and disadvantages known to prior art mobile transfer and storage tanks, the present invention was conceived and one of its objectives is to provide a mobile transfer and storage tank and method which includes an enclosed pumping apparatus to increase its usefulness and ease of operation, even during low temperature periods.

It is another objective of the present invention to provide a mobile sludge transfer and storage tank and method which allows quick and easy filling or emptying by vehicle drivers with relatively little training.

It is yet another objective of the present inventoon to provide a mobile sludge transfer and storage tank which has a flat bottom for resting thereon at the job site and which provides prompt and efficient filling for applicator vehicles from the transfer and storage tank or from the transport vehicle without a suction force generated by the applicator vehicle and without the connecting and disconnecting of suction lines to the applicator vehicle, thereby decreasing the loading time required.

It is still another objective of the present invention to provide a mobile sludge transfer and storage tank which includes a pivotal top delivery tube which is easily stored and the tank holds a greater capacity than conventional transfer and storage tanks and which has pumping apparatus and piping for circulating sludge internally to provide a method for the homogenous mixing of the sludge.

Another objective of the present invention is to provide a mobile transfer and storage tank having an internal compartment for containing the pumping apparatus to assist in preventing freezing during cold periods.

Other objectives and advantages of the present invention will become apparent to those skilled in the art as a more complete description of the invention is set forth below.

SUMMARY OF THE INVENTION

The aforesaid and other objectives of the invention are realized by providing a mobile sludge transfer and storage tank having an enclosed compartment separated from the sludge reservoir for containing pumping apparatus. Pipes are connected to the pumping apparatus whereby sludge can be pumped from a transport vehicle to fill the storage reservoir or applicator vehicle, and the sludge contained in the reservoir can be emptied or circulated respectively by either pumping the sludge to the applicator vehicle which is top loaded or through the reservoir as desired. Also, the pumping apparatus is designed to circulate sludge through the reservoir to maintain a homogenous mixture therein to insure uniform distribution when it is applied to fields. The mobile transfer and storage tank also includes a telescoping control panel and top loading arrangement which allows the applicator vehicle drivers to load sludge without having to dismount from their vehicles to connect and disconnect hoses.

DESCRIPTION OF THE PREFERRED EMBODIMENT

The preferred form of the mobile transfer and sludge storage tank includes a reservoir having a capacity of approximately 21,000 gallons and includes a bottom frame forming a flat bottom surface which will adequately support in a stable fashion the reservoir and other apparatus mounted thereon. An electrical generator is positioned on the frame at the forward end and a pair of wheels are joined to the frame at the rear end for moving purposes. The outer wall or housing of the transfer and storage tank encloses a compartment near the rear wheels for containing a centrifugal pump which is driven by an electric motor mounted nearby. The generator positioned at the forward end of the frame may be powered by a gasoline engine and the pumping apparatus is sized to handle approximately 1,200 gallons of sludge per minute. Control panels provides power and valve controls whereby the pumping apparatus can be directed to pump sludge from a transport vehicle directly into the reservoir, circulate the sludge contained within the reservoir or pump the sludge from the reservoir to an applicator vehicle, or can be operated to pump sludge from the transport vehicle to the applicator vehicle directly.

The preferred method of the invention includes supplying a homogeneous mixture of sludge to a selected field whereby the nutrient characteristics of the soil are improved by rapidly pumping the sludge into the applicator vehicle for efficient distribution of the sludge from either the transfer and storage tank or the transport vehicle by controlling the appropriate valves.

DETAILED DESCRIPTION OF THE DRAWINGS

Figure 1:
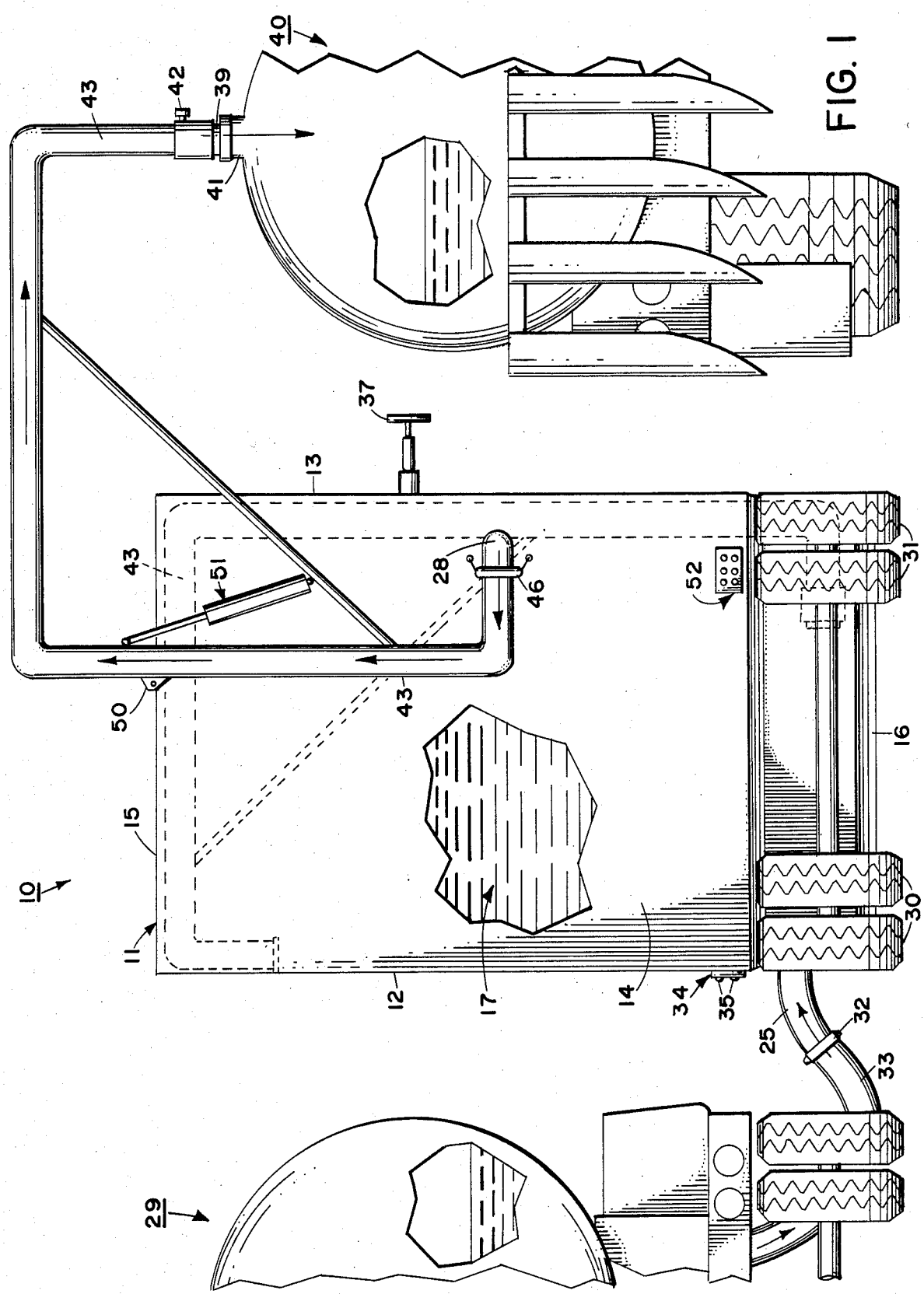
FIG. 1 demonstrates a mobile transfer and storage tank of the present invention with a transport vehicle to the left and an applicator vehicle to the right.
Figure 3:
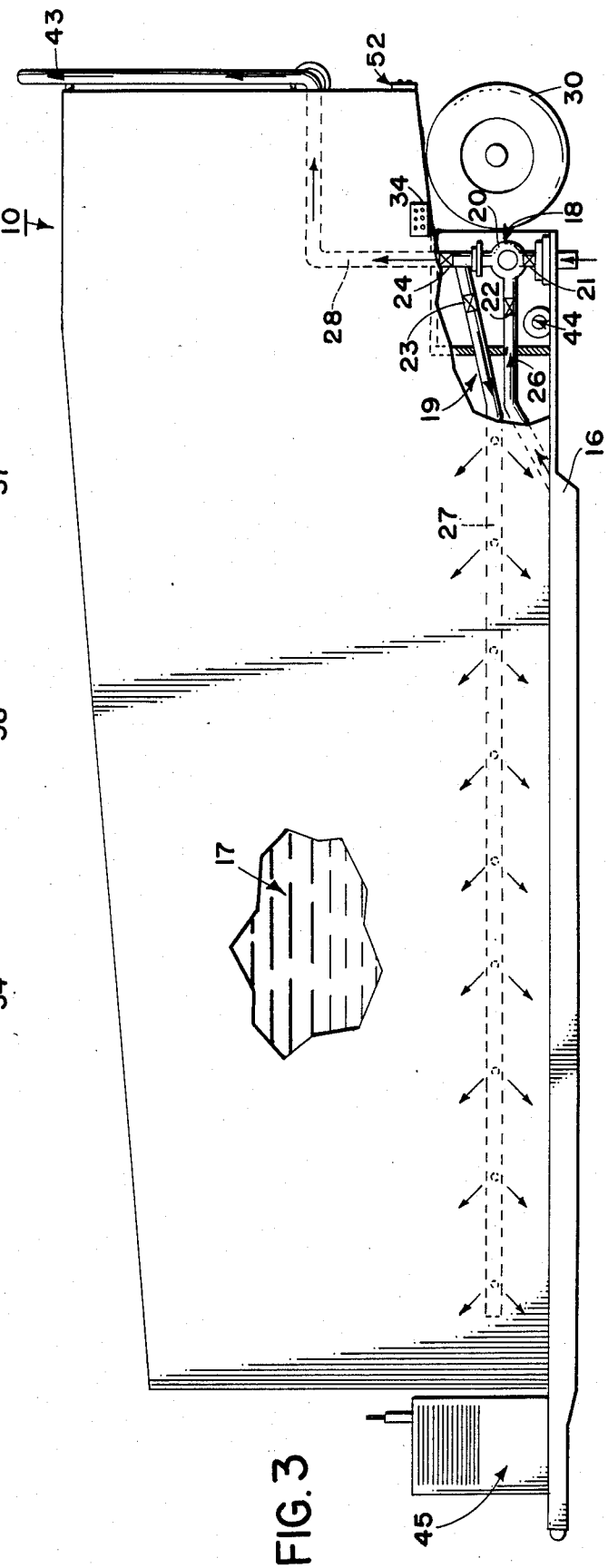
FIG. 3 is a side view of the sludge transfer and storage tank demonstrating in a cut-away view the enclosed compartment containing the pumping apparatus.

Turning now to the drawings, FIG. 1 demonstrates a rear view of mobile sludge transfer and storage tank 10 including housing 11 having left side wall 12, right side wall 13, rear wall 14 and top wall 15. Housing 11 is positioned on frame 16 which extends along the bottom of tank 10 as shown in FIG. 3. As transfer and storage tank 10 is moved from loaction to location frame 16 is lifted off the ground and is pulled by a conventional truck tractor with winch (not shown) and when located on site, rests on frame 16 which forms a flat, stable support to tank 10 as demonstrated in FIG. 3. Housing 11 forms an internal reservoir 17 for holding sludge which consists of treated liquid and solid waste from for example nearby municipalities. Reservoir 17 may hold for example 21,000 gallons which can be applied to infertile farm land or the like to improve the nutrient qualities of the land.

Inside housing 11 but separated from reservoir 17 as shown in FIG. 3 is pumping apparatus 18 within compartment 19. Pumping apparatus 18 includes pump 20 and inlet valves 21, 22 and discharge valves 23 and 24 along with portions of pipes 25, 26, 27 and 28.

In FIG. 1 air compressor 44 is shown mounted in compartment 19 which furnishes a supply of air to operate valves 21, 22, 23 and 24. Valves 21, 22 and 23, 24 operate in synchronization whereby control panel 34 controls inlet valves 21 and 22 and control panel 37 controls discharge valves 23 and 24. As valve 21 is partially opened, valve 22 partially closes and vice versa. Likewise, valves 23 and 24 work in synchronization so the closing of one of said valves will open the other and vice versa. By having pairs of valves operating in synchronization, the transport driver can control the rate of removal of the sludge from the transport 29 and likewise the driver of applicator vehicle 40 controls, by panel 37 the rate of sludge delivery to applicator vehicle 40 as more fully explained below.

Figure 2:
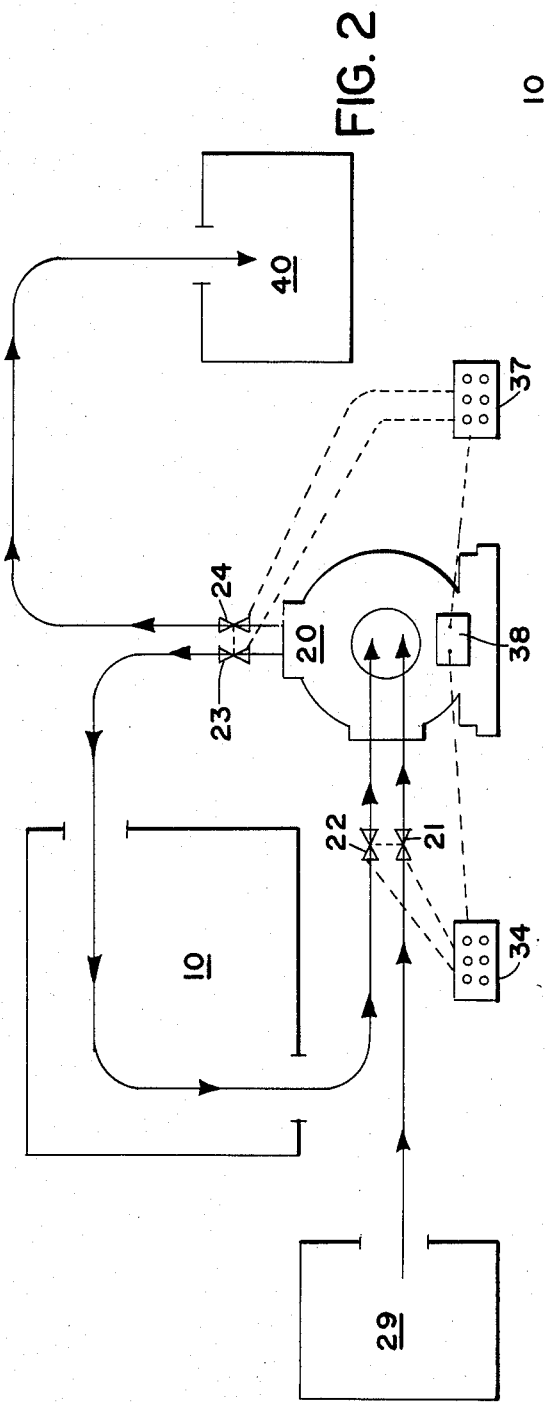
FIG. 2 illustrates in schematic fashion a sludge flow diagram with the pumping apparatus and controls.

Transport vehicle 29 is driven to the on-site location of transfer and storage tank 10 and is coupled to pipe 25 by quick-release fitting 32 which joins pipe 25 with drain tube 33 of transport 29. After drain tube 33 and pipe 25 are coupled, the driver of transport 29 can operate pumping apparatus 18 by control panel 34 shown on side wall 12 of housing 11. Control panel 34 includes a series of valve controls 35 which allow the operator to control the flow of sludge from the truck or reservoir through pumping apparatus 18. As shown in FIG. 2, control panel 34 controls valves 21, 22 and on/off switch 38 of pump 20. As the driver of transport 29 first begins pumping sludge from transport 29, valve 21 may be fully opened whereby sludge will be pumped rapidly from transport 29 into reservoir 17 or into applicator vehicle 40 depending on the position of valves 23 and 24. Valve 22 may be partially opened (with simultaneous partial closing of valve 21) to provide a mixing of the sludge from transport 29 and the sludge contained within reservoir 17. Later, after transport 29 is empty and valve 21 is closed it may be desirable to circulate the sludge within reservoir 17 whereupon valves 22 and 23 would be opened. Thus, whether or not sludge transfer and storage tank 10 has a quantity of sludge the driver of applicator vehicle 40 as shown in FIG. 1 can fill the tank of his vehicle from either tank 10 or transport vehicle 29.

The driver of applicator vehicle 40 positions his vehicle under delivery spout 39 of delivery tube 43 as seen in FIG. 1 and delivery spout 39 is adjustably moved along tube 43 to provide a close fitting with fill spout 41 positioned at the top of applicator vehicle 40. A threaded screw or delivery spout securing means 42 may be provided to hold delivery spout 39 at the correct position (height).

The flow of sludge through delivery tube 43 can be controlled by telescoping control panel 37 shown on the right side of housing 11 (wall 13) in FIG. 1. Panel 37 controls on/off pump switch 38 and valves 23 and 24 (FIG. 2). Control panel 37 controls the flow of the sludge either to applicator vehicle 40 or to reservoir 17. Sludge circulation through valves 22 and 23 may continue as the applicator vehicle is driven to and from the desired location as required.

During colder temperatures freezing is prohibited by compartment 19 whereby pumping apparatus 18 as shown in FIG. 3 is fully enclosed therein as are valves 21, 22, 23 and 24. A hinged access door may be provided on compartment 19 for ease of entry. Pump 20 may be a centrifugal pump of approximately 1,200 gal./min. capacity having an electric motor (not shown) for driving purposes. Compartment 19 may also be insulated as required for extremely cold conditions but in most locations the heat produced from the electric pump motor (not shown) will provide sufficient heat to keep the pump and valves at sufficient working temperatures without the addition of insulation. To provide power to the electric motor of pump 20, generator 45 is shown positioned at the forward end of frame 16 in FIG. 3 which may be powered by a diesel or gasoline engine as in conventional generating systems.

As further seen in FIG. 1, coupler 46 allows delivery tube 43 to connect with pipe 28. Delivery tube 43 exceeds the highway height and width requirements when positioned as in FIG. 1 and therefore must be lowered during transportation. A convenient storage mode is provided for delivery tube 43 whereby it rotates around pivot means 50 as air cylinder 51 contracts to allow the compact storage of delivery tube 43 along rear wall 14 of housing 11 as shown by the dotted lines in FIG. 1. Air cylinder 51 is operated by air compressor 44 as are control valves 21, 22, 23 and 24 and air cylinder 51 is controlled by control panel 52 on rear wall 14 above rear wheels 31 as seen in FIG. 1 and is used to position delivery tube 43 for use or take-down for storage purposes by respectively extending and contracting air cylinder 51.

Various modifications can be made to this invention without departing from its scope and the examples and illustrations presented herein are for explanatory purposes and are not intended to limit the appended claims.

I claim:

1. An improved mobile transfer and sludge storage tank which is placed on site and moved by a tractor as needed having a frame, a housing joined to said frame in which said housing forms a reservoir for holding sludge, a pair of wheels joined to said frame, the improvement comprising:
   (a) said frame forming a flat bottom for contacting the ground to maintain the storage tank in a stable position when disconnected from the tractor,
   (b) pumping apparatus having suction and discharge ports, said pumping apparatus for pumping sludge into said reservoir from a transport vehicle and out of said reservoir into an applicator vehicle, said pumping apparatus mounted on said frame, (c) piping means joined to said pumping apparatus for circulating sludge through said reservoir to maintain a homogeneous mixture of the sludge and for pumping to the applicator vehicle, and (d) a telescoping control panel, said control panel positioned on said housing.

2. An improved mobile sludge transfer and storage tank as claimed in claim 1 with the improvement including: an electrical generator mounted on said frame for supplying power to said pumping apparatus.

3. An improved mobile sludge transfer and storage tank as claimed in claim 1 with the improvement including an enclosed compartment within said housing separated from said reservoir for containing said pumping apparatus.

4. An improved mobile sludge transfer and storage tank as claimed in claim 3 and including a delivery tube, said delivery tube having a slidable outlet nozzel positioned thereon.

5. An improved mobile sludge transfer and storage tank as claimed in claim 1 with the improvement including: control means for simultaneously pumping sludge into the reservoir and into an applicator vehicle from a transport vehicle.

6. An improved mobile sludge transfer and storage tank as claimed in claim 1 and including a discharge valve, said control panel for regulating said discharge valve.

7. An improved mobile sludge transfer and storage tank as claimed in claim 1 and including an inlet valve, said control panel for regulating said inlet valve.

8. An improved mobile sludge transfer and storage tank as claimed in claim 1 and including a pivotal disconnectable delivery tube, said tube formed with a width substantially the same as the width of the storage tank for compact storage against said storage tank when not in use.

* * * * *